United States Patent
Wu

(10) Patent No.: US 9,500,803 B2
(45) Date of Patent: Nov. 22, 2016

(54) APPARATUS FOR COMPENSATING IMAGE OF DISPLAY, DISPLAY AND JOINT DISPLAY

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 384 days.

(21) Appl. No.: 14/164,136

(22) Filed: Jan. 25, 2014

(65) Prior Publication Data

US 2014/0218959 A1     Aug. 7, 2014

(30) Foreign Application Priority Data

Feb. 5, 2013   (TW) .............................. 102104487 A
Sep. 27, 2013  (TW) .............................. 102135215 A

(51) Int. Cl.
*G02B 6/08* (2006.01)
*G09F 9/302* (2006.01)
*G02F 1/1335* (2006.01)
*G02F 1/1333* (2006.01)

(52) U.S. Cl.
CPC ........... *G02B 6/08* (2013.01); *G02F 1/133524* (2013.01); *G09F 9/3026* (2013.01); *G02F 1/13336* (2013.01)

(58) Field of Classification Search
CPC .......... F21V 2200/10; F21V 2200/20; F21W 2121/00; G02B 6/0008; G02B 6/08; G02B 6/46; G02B 6/0078; G06F 3/042; Y10T 29/49826; Y10T 156/1062; G02F 1/13336; G02F 1/133524; G09F 9/3026
See application file for complete search history.

(56) References Cited

U.S. PATENT DOCUMENTS

2011/0025594 A1    2/2011  Watanabe
2011/0255301 A1*  10/2011  Watanabe ........... G02F 1/13336
                                                              362/558

FOREIGN PATENT DOCUMENTS

CN    101965604 A    2/2011
CN    102216972      10/2011

* cited by examiner

*Primary Examiner* — Stephen F Husar
*Assistant Examiner* — Danielle Allen
(74) *Attorney, Agent, or Firm* — Zhigang Ma

(57) ABSTRACT

An apparatus for compensating an image of a display includes a light incident surface, a light emitting surface, and a plurality of light guiding channels independent from each other. The light incident surface is configured to be adjacent to the display to receive the image of the display into the apparatus. An area of the light emitting surface being greater than an area of the light incident surface. Each light guiding channel extends from the light incident surface to the light emitting surface. The light guiding channels is configured for transmitting the image from the light incident surface to the light transmitting surface and expanding the image such that the expanded image is displayed on the light emitting surface.

12 Claims, 15 Drawing Sheets

APPARATUS FOR COMPENSATING IMAGE OF DISPLAY, DISPLAY AND JOINT DISPLAY

CROSS-REFERENCE TO RELATED APPLICATIONS

This application is related to a U.S. patent application Ser. No. 14/164,139 entitled "APPARATUS FOR COMPENSATING IMAGE OF DISPLAY AND METHOD FOR MANUFACTURING SAME", a U.S. patent application Ser. No. 14/164,140 entitled "APPARATUS FOR COMPENSATING IMAGE OF DISPLAY AND METHOD FOR MANUFACTURING SAME", a U.S. patent application Ser. No. 14/164,137 entitled "DISPLAY ELEMENT, DISPLAY DEVICE AND JOINT DISPLAY", and a U.S. patent application Ser. No. 14/164,118 entitled "DISPLAY DEVICE, JOINT DISPLAY AND BACKLIGHT MODULE". This application also claims the foreign priority application filed in Taiwan as Serial No. 102104487 on Feb. 5, 2013, and Serial No. 102135215 on Sep. 27, 2013. These related applications are incorporated herein by reference

BACKGROUND

1. Technical Field

The present disclosure relates to an apparatus for compensating an image of a display, a display including the image compensating apparatus, and a joint display including at least displays.

2. Description of Related Art

Display devices are widely used in consumer electronic products. An increasing need is to provide a big display device for displaying an image having big size. Yet, the big display device is expensive. Thus, there is a need for providing a number of display devices having limited sizes to cooperatively display the image having big size, and a need for providing a backlight module used in the display devices.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
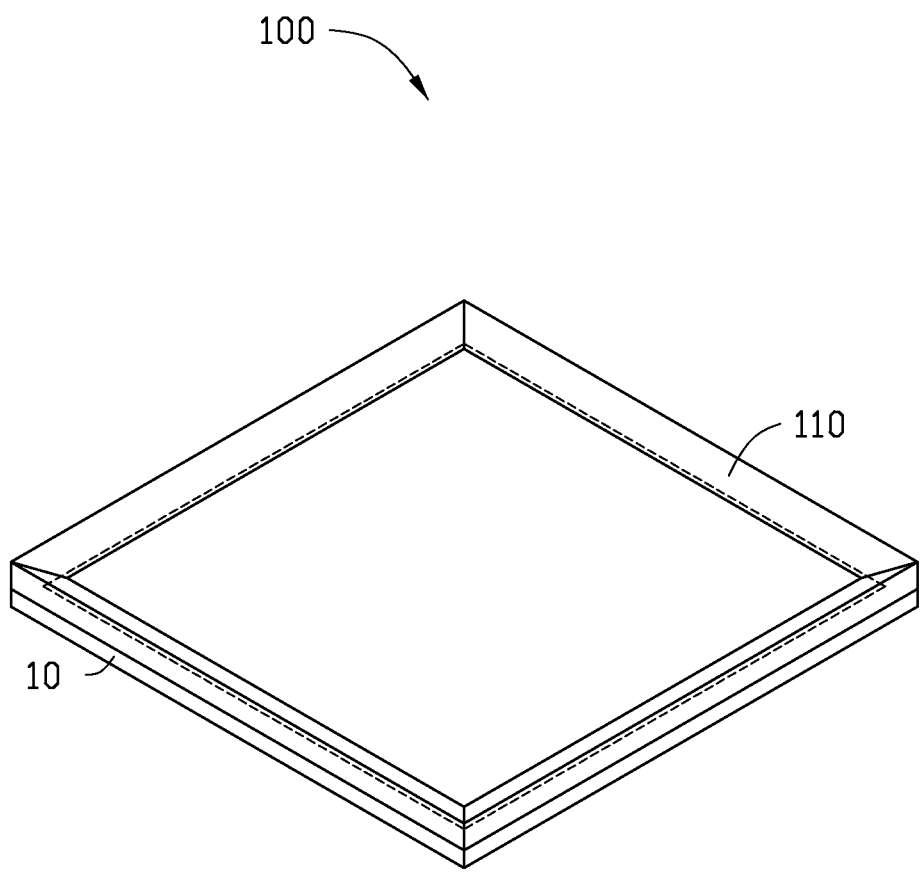
FIG. 1 a schematic, isometric view of a first embodiment of a display of the present disclosure.
Figure 2:
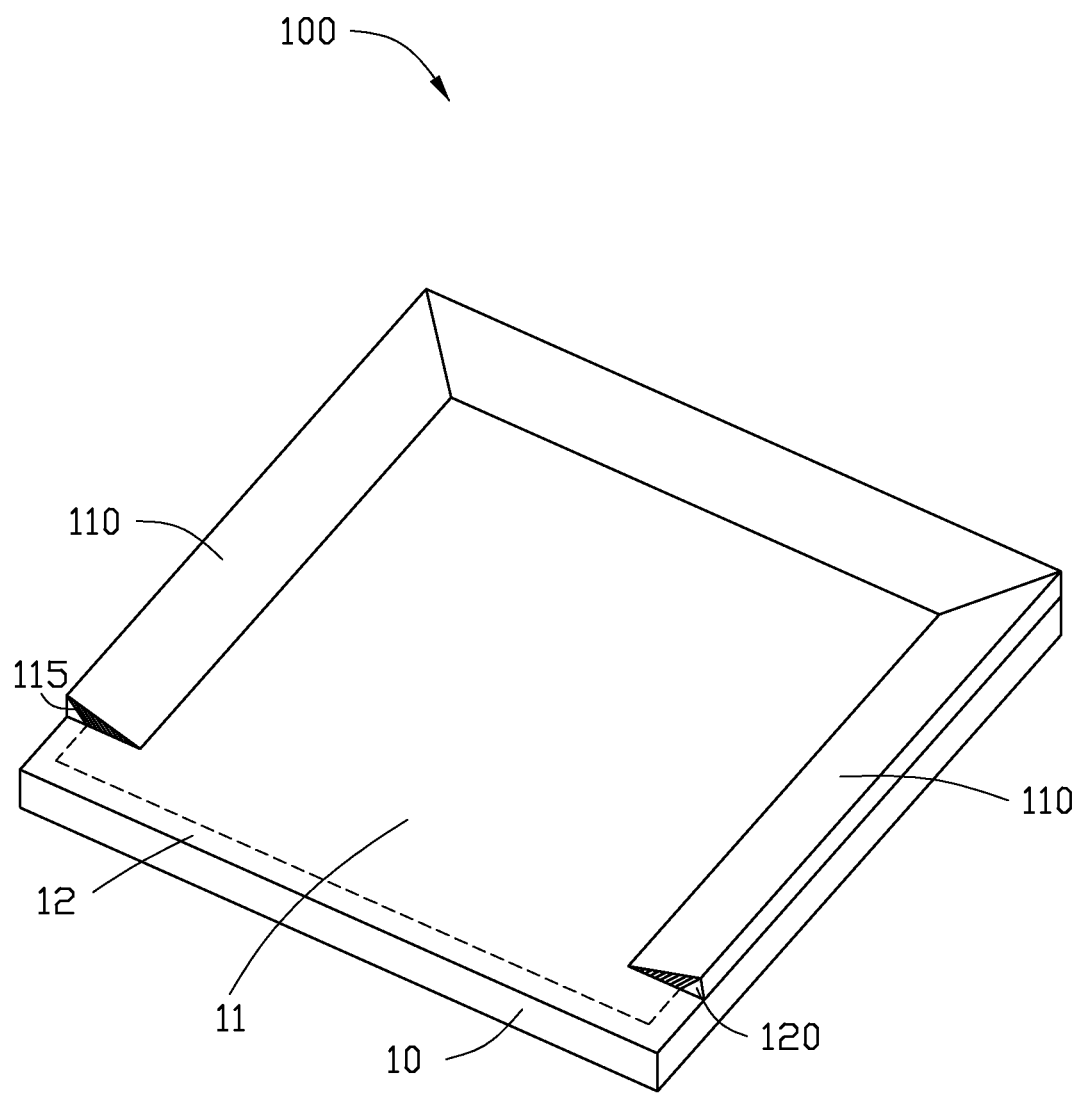
FIG. 2 is a partial cutaway view of the display.

FIG. 1 is a schematic, isometric view of a first embodiment of a display of the present disclosure. The display 100 includes a display panel 10, an image compensating apparatus 110 set on the display panel 10, and a support portion 120. FIG. 2 is a partial cutaway view of the display 100. The display panel 10 defines a display region 11 and a non-display region 12 encircling a periphery of the display region 11. The image compensating apparatus 110 is set on display region 11 along a border between the display region 11 and the non-display region 12. A covering portion 115 of the image compensating apparatus 110 is extended to cover the non-display region 12. The image compensating apparatus 110 is used to enlarge a display area of the display region 11 to cover the non-display region 12. The support portion 120 is set on the non-display region 11 to support the image compensating apparatus 110. In this embodiment, the support portion 120 resists again the covering portion 115 to support the covering portion 115. It is understood that, for a joint display consisting of a number of display panels 10, the image compensating apparatus 110 is set at a border between two adjacent display panels 10. In this embodiment, there are four image compensating apparatuses 110 set on the non-display regions 12. Referring to a top view of FIG. 3, each of the image compensating apparatuses 110 is shaped as an isosceles trapezoid. The four image compensating apparatuses 110 are connected end to end to form a rectangular frame. In the other alternative embodiment, the support portion can be omitted.

Figure 3:
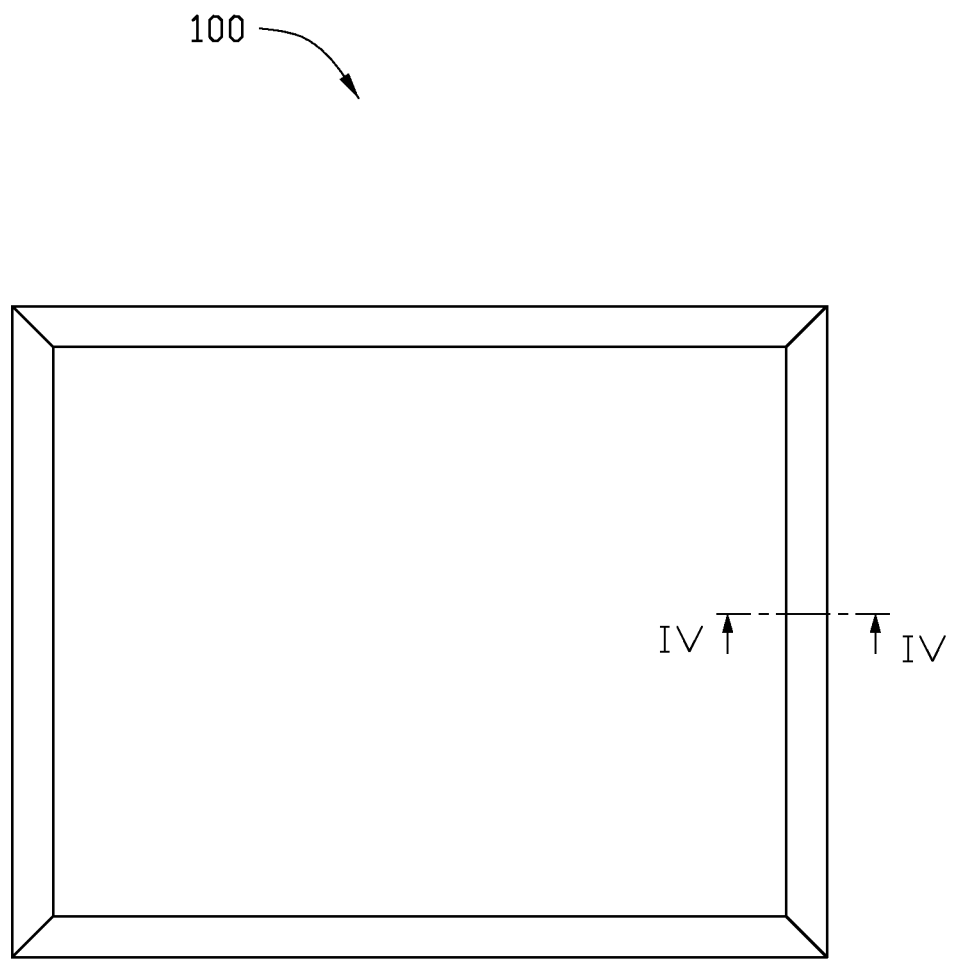
FIG. 3 is a top view of the display of FIG. 1.
Figure 4:
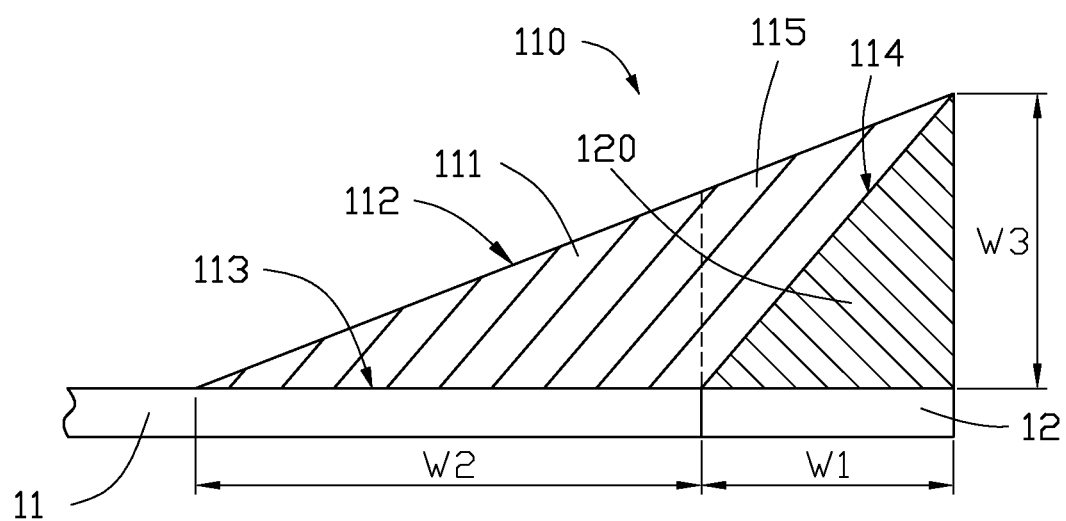
FIG. 4 is a cross-sectional view taken along IV-IV line of FIG. 3.

Referring to FIG. 4, FIG. 4 is a cross-sectional view of FIG. 3 taken along IV-IV line. The four image compensating apparatuses 110 are set on a border of the display region 11 and adjacent to the non-display region 12. At the corner of the display region 11, two opposite ends of the image compensating apparatuses 110 are connected end to end via an inclined end surface to form a closed compensating frame. An included angel between the inclined end surface and a periphery of the display 100 is preferred to be 45 degree.

In this embodiment, the image compensating apparatus 110 is a triangular prism with a cross section shaped as an obtuse triangle. The support portion 120 is a prism with a side surface resisting again the image compensating apparatus 110. The image compensating apparatus 110 includes a light emitting surface 112, a light incident surface 113, and an inclined surface 114. In this embodiment, the light incident surface 113 is a bottom surface contacting with the display panel 10. The light emitting surface 112 inclines to the light incident surface 113. The light incident surface 113, the light emitting surface 112, and the inclined surface 114 are connected with each other. The light incident surface 113 and the inclined surface 114 from an obtuse triangle therebetween. The obtuse angle is preferred to be 135 degree. A projection of the light emitting surface 112 on the light incident surface 113 is greater than an area of the light incident surface 113.

The image compensating apparatus 110 includes a number of light guiding channels 111. In this embodiment, each of the light guiding channels 111 is a light guiding fiber. Because a light path of each light guiding fiber is independent from the light path of the other light guiding fiber, the light passing through each light guiding fiber do not disturb with the light passing through the other light guiding fiber. Each of the light guiding fibers extends from the light incident surface 113 to the light emitting surface 112. An extending direction of the light guiding fibers is parallel to the inclined surface 114. Each of the light guiding channels 111 extends along a substantially same direction. The light guiding channels 111 are arranged as a matrix.

In this embodiment, a width of the non-display region 12 is presented as W1. The bottom width of the support portion 120 is also W1. Both of a height of the support portion 120 and a height of the image compensating apparatus 110 are presented as W3. A bottom width of the image compensating apparatus 110 is presented as W2. The W2 is greater than the W1. Preferably, the W2 is a double of the W1. For example, when the W1 is 3 millimeters (mm), the W2 is 6 mm.

The display region 11 includes a number of pixels. Light from the pixels is enter the image compensating apparatus 110 via the light incident surface 113 and emits out from the light emitting surface 112. Because the projection of the light incident surface 112 on the display panel 10 is greater than the area of the light incident surface 113, an image of the display region 11 covered by the light incident surface 113 is transmitted to the light emitting surface 112 covering the non-display region 12. Thus, the non-display region 12 is invisible to a viewer. The display 100 has a zero border effect.

Figure 5:
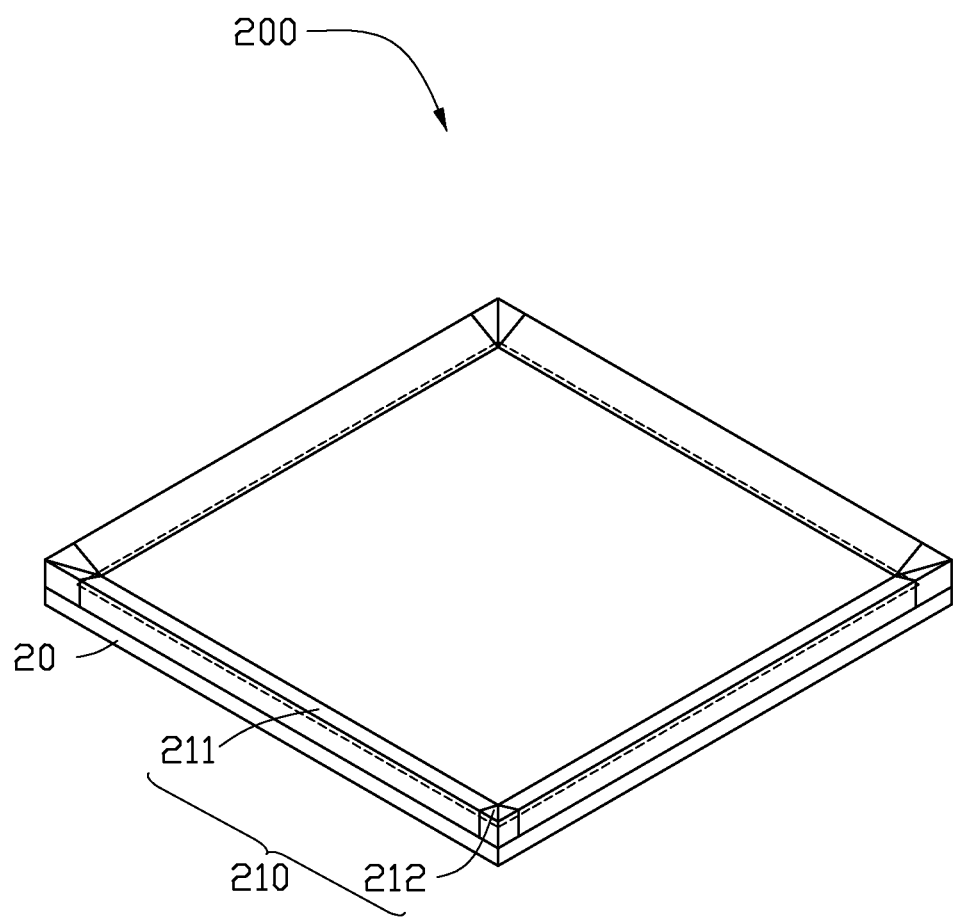
FIG. 5 is a schematic, isometric view of a second embodiment of a display of the present disclosure.

FIG. 5 is a schematic, isometric view of a second embodiment of a display 200. The display includes a display panel 20 and an image compensating apparatus 210 set on the display panel 20. A difference between the image compensating apparatus 210 of the second embodiment and the image compensating apparatus 110 of the first embodiment is that the image compensating apparatus 210 includes a number of elongated side image compensating apparatuses 211 and a number of corner image compensating apparatuses 212. A display effect of four corners of the display 200 is improved by the corner image compensating apparatuses 212.

Figure 6:
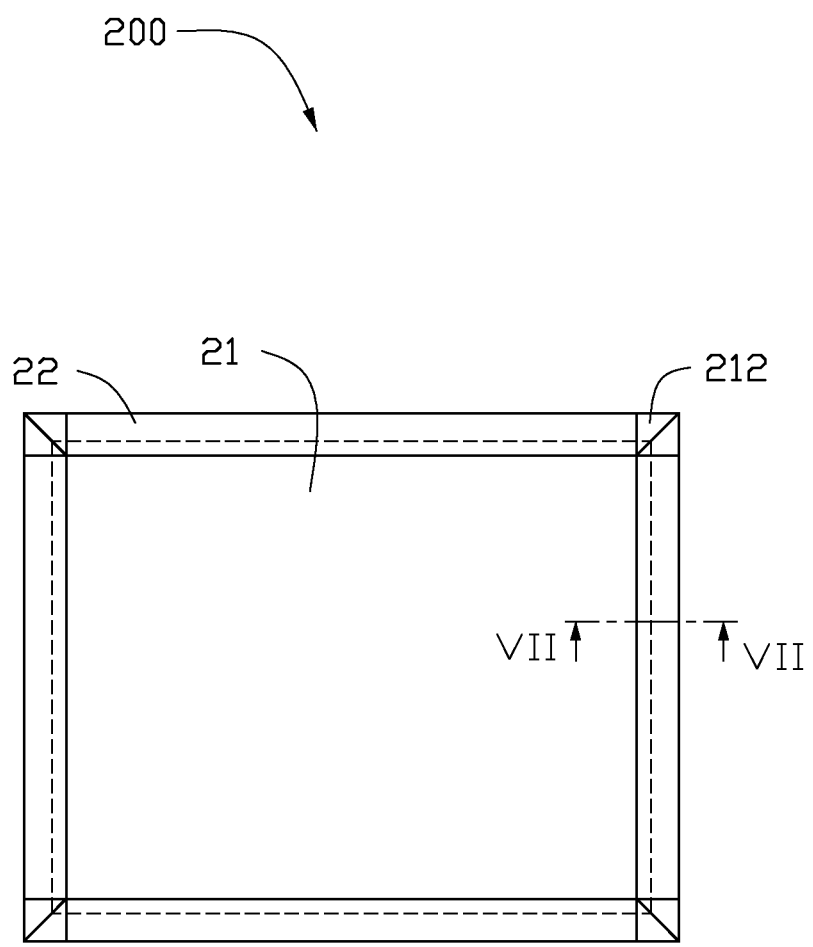
FIG. 6 is a top view of the display of FIG. 5.
Figure 7:
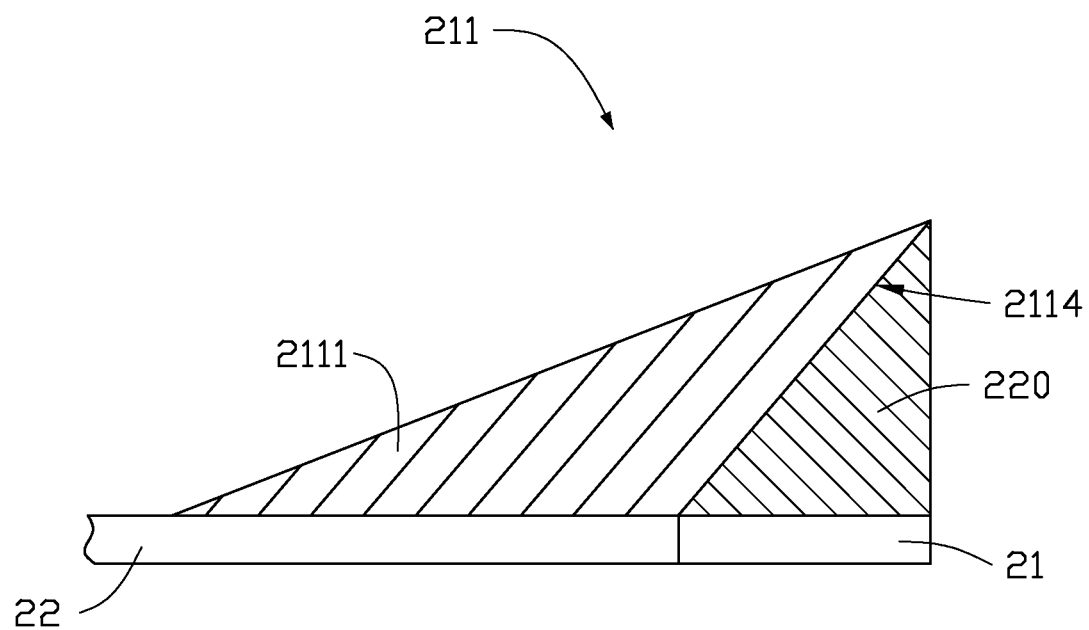
FIG. 7 is a cross-sectional view taken along VII-VII line of FIG. 6.

Referring to FIGS. 6 and 7, two adjacent side image compensating apparatuses 211 are connected via one of the corner image compensating apparatuses 212. Referring to a top view of FIG. 6, four side image compensating apparatuses 211 and four corner image compensating apparatuses 212 are alternatively connected end to end to form a rectangular closed frame. The corner image compensating apparatuses 212 are correspondingly located at four corner of the display region 21.

Referring to FIG. 7, the side image compensating apparatus 211 includes a number of light guiding channels 2111 arranged as a matrix. In this embodiment, each of the light guiding channels 2111 is a light guiding fiber with an even diameter. The light guiding channels 2111 extend from the light incident surface 213 to the light emitting surface 214. The light guiding channels 2111 are parallel to the inclined surface 114. A light from the display region 21 enters the image compensating apparatus 210 from the light incident surface 213 and emits out of the image compensating apparatus 210 by passing through the light guiding channels 2111. Thus, the viewer can see the image on the light emitting surface 214.

Figure 8:
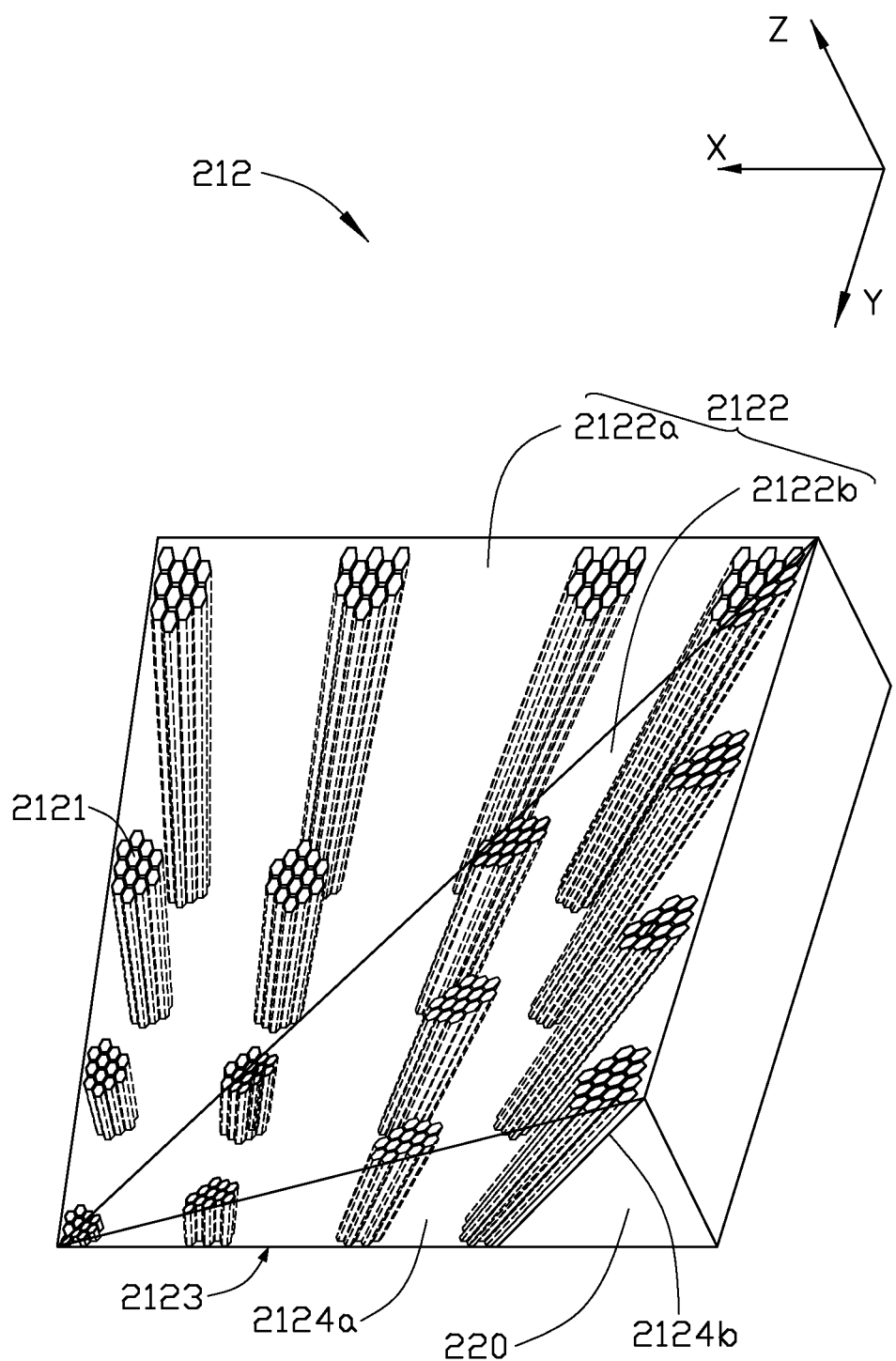
FIG. 8 is a schematic, isometric view of a corner image compensating apparatus.
Figure 9:
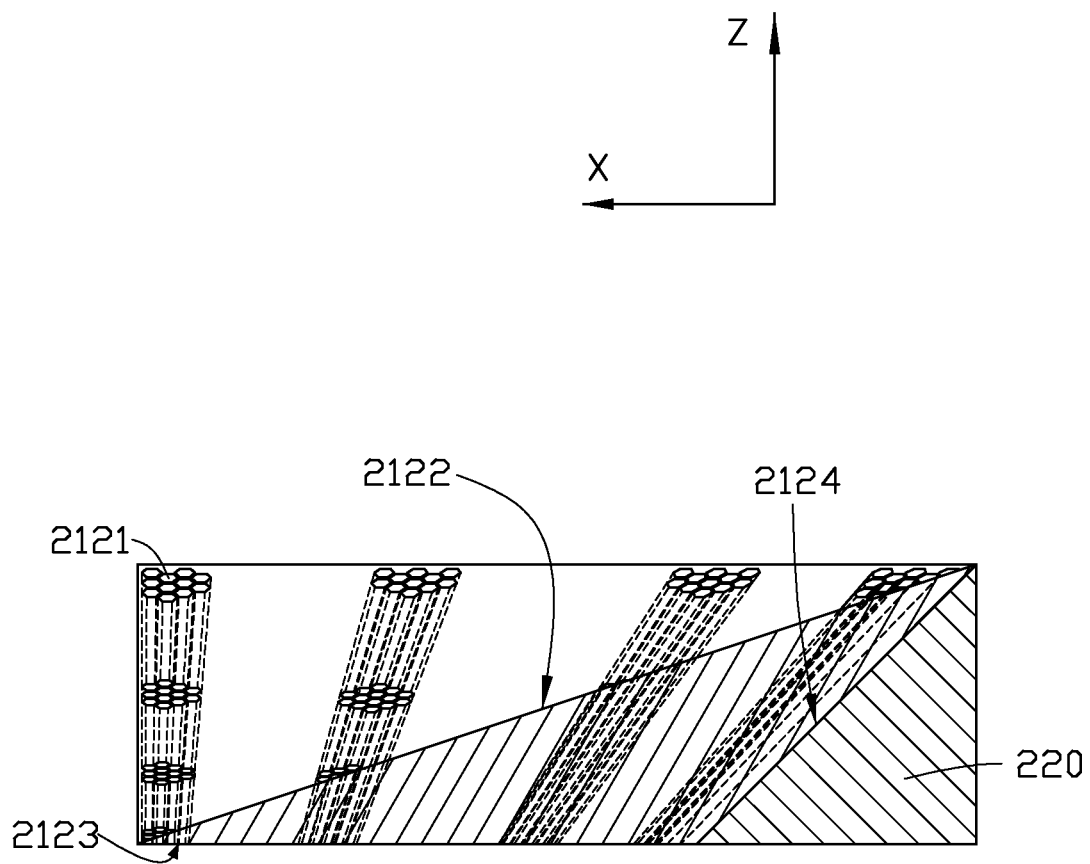
FIG. 9 is a front view of the corner image compensating apparatus.

Referring to FIGS. 8 and 9, each of the corner image compensating apparatuses 212 includes a light output surface 2122, a light input surface 2123, and a sloping surface 2124. The light input surface 2122 includes a pair of interconnecting sub-output surfaces 2122a and 2122b. Preferably, the sub-output surface 2122a is not coplanar with the other sub-output surface 2122b. In this embodiment, the pair of the sub-output surfaces 2122a and 2122b forms an included obtuse angle. In this embodiment, the light input surface 2123 is a bottom surface of the image compensating apparatus 210 contacting with the display region 21. The sloping surface 2124 includes a pair of interconnecting sub-surfaces 2124a and 2124b. The sloping surface 2124 correspondingly connects with the light output surface 2122 and the light input surface 2123. The sub-output surfaces 2122a and 2122b are inclined to the light input surface 2123. The sub-surfaces 2124a and 2124b correspondingly form an obtuse angle with the light input surface 2123. Preferably, the obtuse angle is 135 degree.

Each of the corner image compensating apparatus comprises a number of light guiding channels 2121. Each of the light guiding channels 2121 is combined with a number of alveolate light guiding fibers. The light guiding fibers extends from the light input surface 2123 to the sub-output surfaces 2122a and 2122b. A diameter of the light guiding fibers of the corner image compensating apparatus 211 gradually increases in the extending direction. In detail, referring to a coordinate system of FIG. 8, when the light guiding fiber extends along a Z axis, radius of the light guiding fiber in X axis and Y axis are gradually increased. Also referring to FIG. 10, a cross-sectional area of the light guiding fiber gradually increases in the extending direction.

Because the projection of the light output surface 2122 on the display panel 20 is greater than the area of the light input surface 2123, an image of the display region 21 covered by the light input surface 2123 is transmitted to the light output surface 2122 covering the non-display region 22. Thus, the non-display region 22 is invisible to a viewer. The display 200 has a zero border effect.

Figure 11:
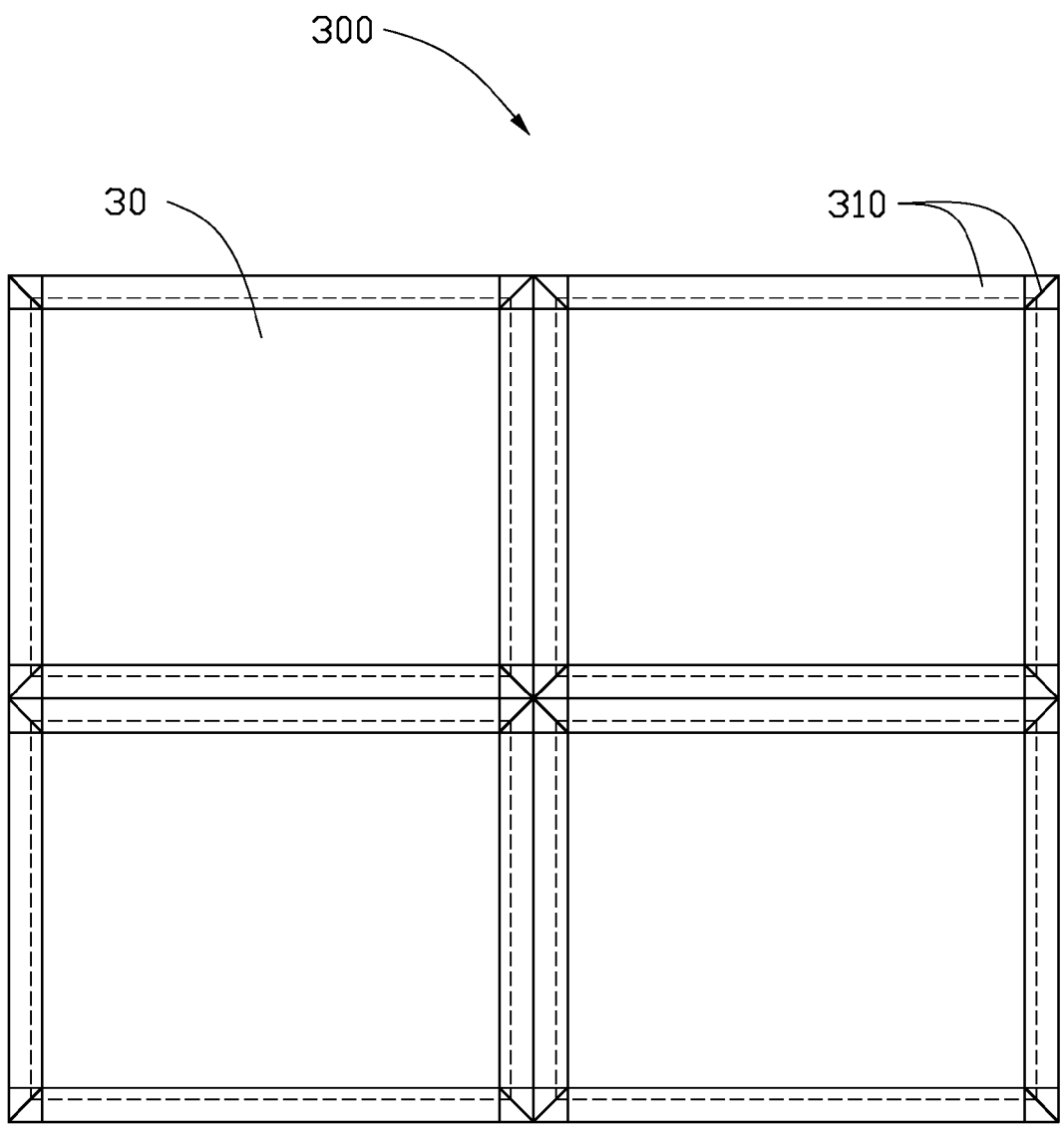
FIG. 11 is a schematic, exploded view of a first embodiment of a joint display.

Referring to FIG. 11, the image compensating apparatus 310 can be employed in a joint display 300. The image compensating apparatuses 310 are set at a number of connecting seams between adjacent display panels 30 arranged as matrix. A zero border effect of the display 300 is realized by the image transmitting function of the image compensating apparatuses 310.

In the other alternative embodiments of the present disclosure, the display 200 can be, but is not limited to, a liquid crystal display panel and a plasma display panel. The shape of the image compensating apparatus 310 can be changed according to the shape of the display 300. The light input surface 2123 could be parallel to the light output surface 2122. For example, a cross-section of the image compensating apparatus 310 is a isosceles trapezoid. The light output surface 2122 is a top surface of the isosceles trapezoid and the light input surface 2123 is a bottom surface of the isosceles trapezoid. The light guiding channel 2111 is combined with a number of light guiding thin plates, silica fibers, glass fibers, or the other light penetrating material. In the other embodiment, the support portion is omitted. The image compensating apparatus 310 is fastened to the display panel 30 via glue or the other fastener.

Figure 12:
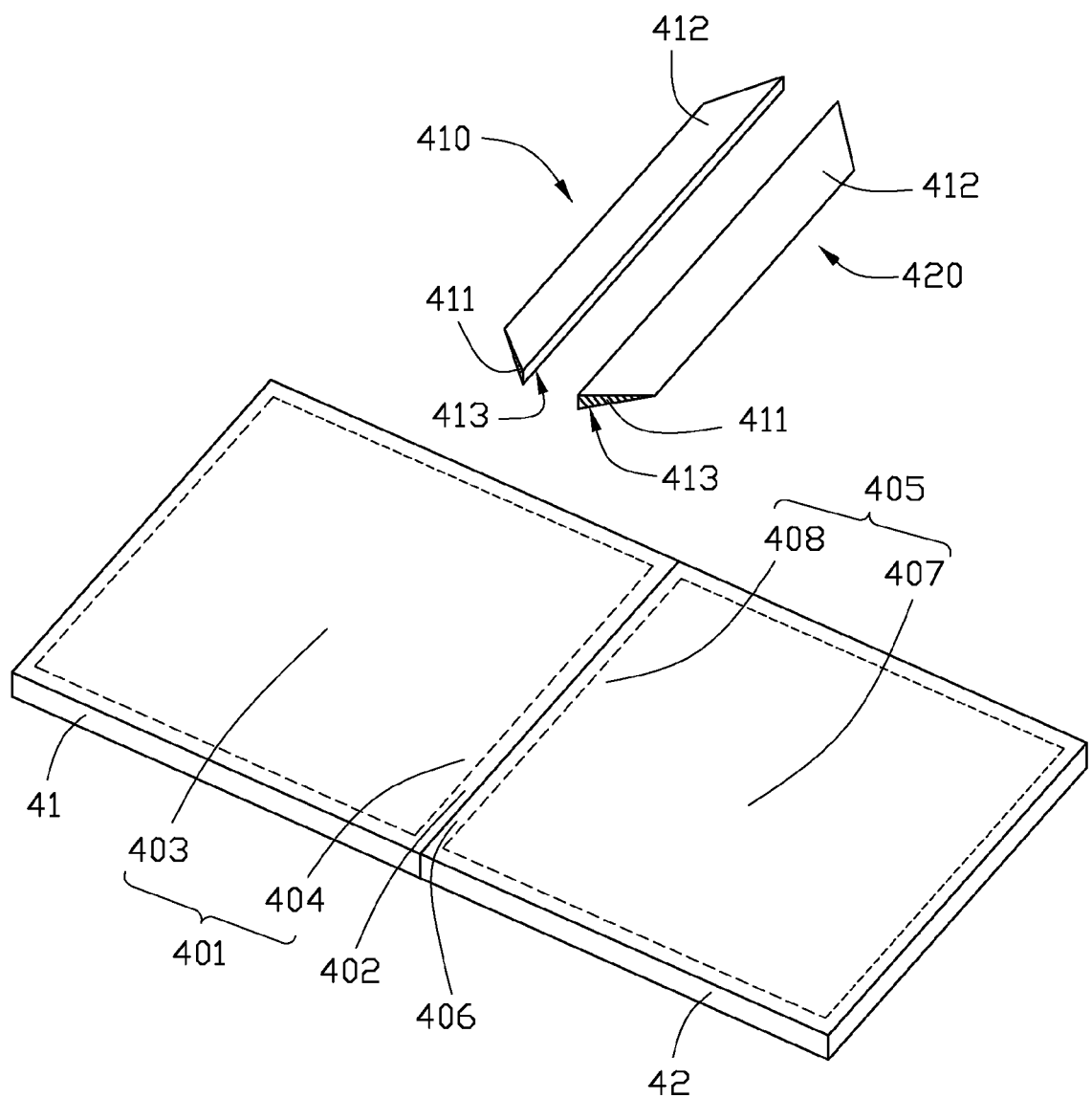
FIG. 12 is a schematic view of a second embodiment of a joint display.
Figure 13:
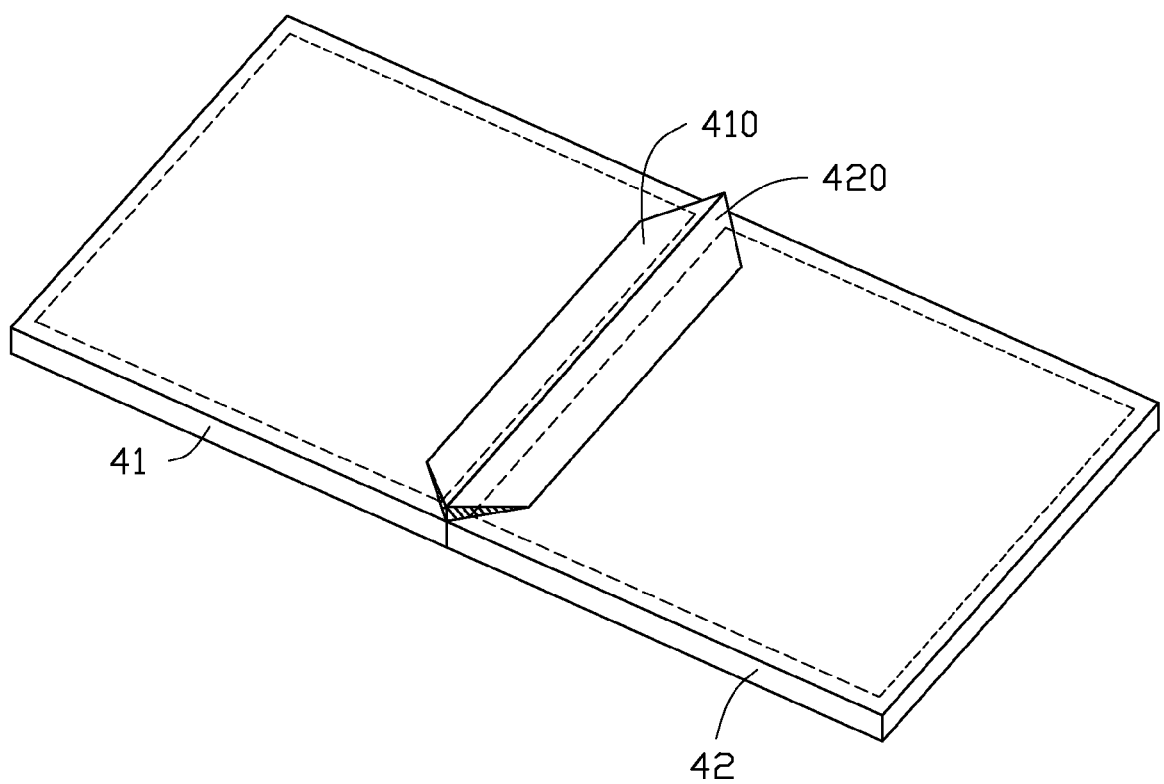
FIG. 13 is a schematic, assembled view of the joint display of FIG. 12.

FIG. 12 is a schematic view of a second embodiment of a joint display 400. FIG. 13 is a schematic, assembled view of the joint display of FIG. 12. A difference between the joint display 400 and the first embodiment of the joint display 300 is that the joint display 400 includes two display panels 41 and 42 jointed together and two image compensating apparatuses 410 and 420 corresponding to the display panels 41 and 42.

In detail, the joint display 400 includes a first display panel 41, a second display panel 142 connected with the first display panel 141, a first image compensating apparatus 410, and a second image compensating apparatus 420. The first display panel 41 includes a first display region 401 and a first non-display region 402 adjacent to the first display region 402. The first display region 401 defines a first main display region 403 and a first periphery display region 404 located between the first main display region 403 and the first non-display region 402. The first non-display region 402 is adjacent to the second display panel 42. The second display panel 42 includes a second display region 405 and a second non-display region 406 adjacent to the second display region 405. The second non-display region 406 is located between the first non-display region 402 and the second display region 405. The second display region 405 defines a second main display region 407 and a second periphery display region 408.

The first image compensating apparatus 410 is set corresponding to the first periphery display region 404. The second compensating apparatus 420 is set corresponding to the first periphery display region 404. The cross-sectional view of the first and second image compensating apparatus 410 and 420 is similar to the cross-sectional view of the image compensating apparatus of FIGS. 2, 4, 5, and 9. That is, each of the first and second image compensating apparatus 410 and 420 includes a light incident surface 413, a light emitting surface 412, and a number of independent light guiding channels 411 extending from the light incident surface 413 to the light emitting surface 412. A part of the light emitting surface 412 is extended to cover the first non-display region 402. The first and second image compensating apparatuses 410 and 402 is used to enlarge an image of the first and second periphery display regions 404 and 408 received by the light incident surface 413 and transmit to the light emitting surface 412. The image enlarged by the first and second image compensating apparatuses 410 and 420 is extended out of sides of the first and second periphery display region 404 and 406 away from the first and second main display region 403 and 407.

Preferably, the first image compensating apparatus 410 is fastened to the second image compensating apparatus 420 via an adhesive or the other fastener. The first and second compensating apparatuses 410 and 420 also can be integrated made. Thus, a display consisting of the display panel 41 and the image compensating apparatus 410 can display an image larger than its display region to make the joint display 400 displays an image larger than its display region. Because the image compensating apparatuses 410 and 420 is set at a joint between two display panels 41 and 42, a zero border effect of the joint display 400 is achieved.

Figure 14:
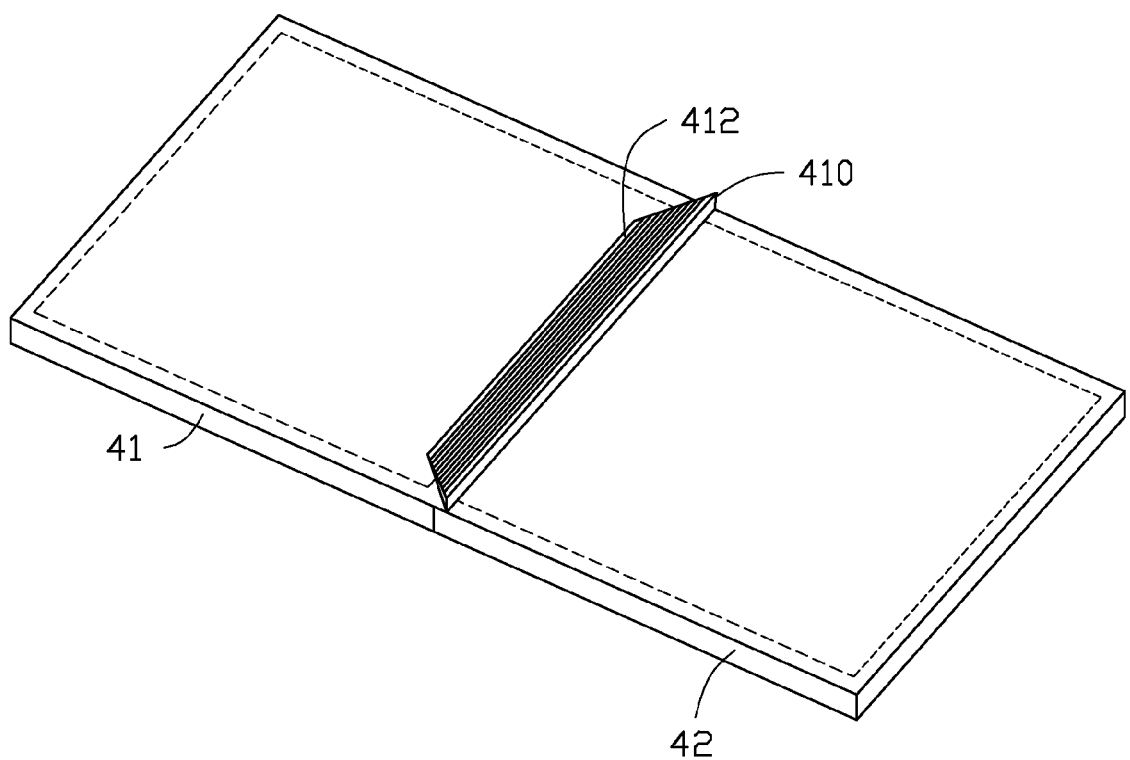
FIG. 14 is a schematic view of an alternative assembled embodiment of the joint display of FIG. 13.

It is understood that, in this embodiment, a projection of the light emitting surface 412 of the first image compensating apparatus 410 on the joint display 400 covers the first non-display region 402 and a first periphery display region 403 and a projection of the light emitting surface 412 of the second compensating apparatus 420 on the joint display 400 covers the second non-display region 406 and the second periphery display region 407, which make the joint display zero border. Referring to FIG. 14, in the other embodiment, the joint display 400 only includes the first image compensating apparatus 410. The projection of the light emitting surface 412 on the joint display 400 covers the first non-display region 402, a first periphery display region 403, and the second non-display region 406, which also make the joint display 400 zero border.

Figure 10:
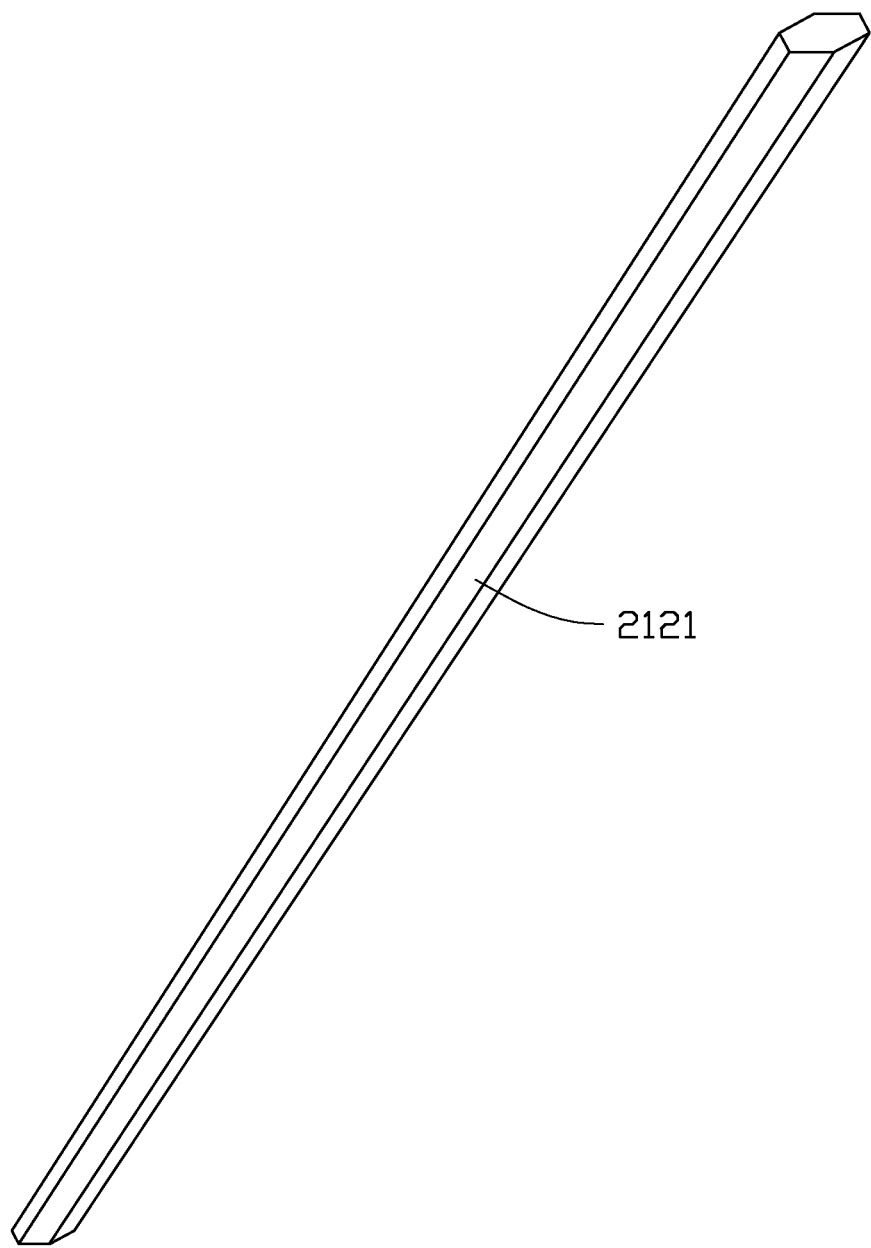
FIG. 10 is a schematic, isometric view of a light guiding fiber.
Figure 15:
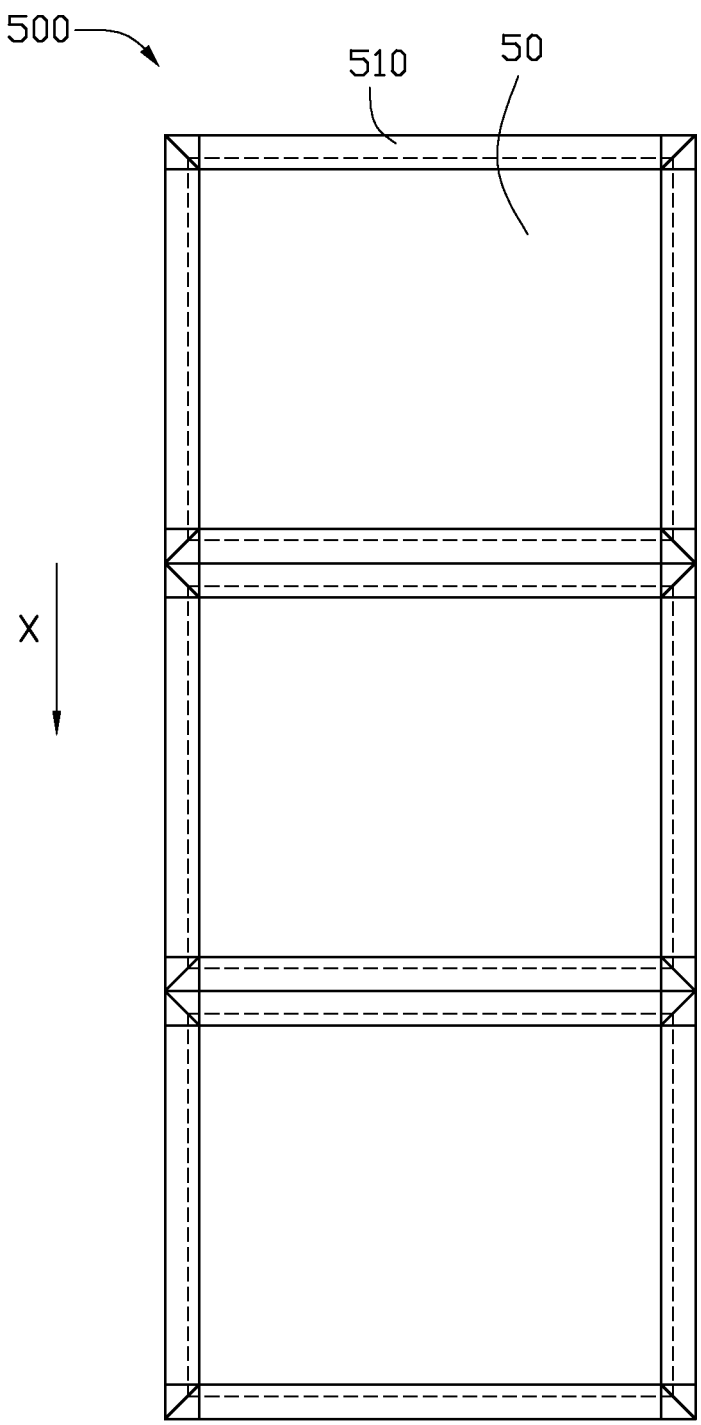
FIG. 15 is a schematic view of a third embodiment of a joint display.

FIG. 15 is a schematic view of a third embodiment of the joint display 500. A difference between the joint display 500 and the joint display 300 of the first embodiment illustrated in FIG. 10 is that the joint display 500 includes three display panels 50 lined along a same direction, such as X axis, orderly and a number of the image compensating apparatuses 510 set on each display panel 50. Similarly, in the third embodiment, each display panel 50 of the joint display 500 can display an image larger than its display region and the image compensating apparatuses 510 are set at the joints between each two adjacent display panels 50, which make the joint display 500 zero border.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A display, comprising:
a display panel comprising a display region; and
a first image compensating apparatus expanding an image of a periphery of the display region to a region outside of the display region, the first image compensating apparatus comprising:
a first light incident surface positioned adjacent and corresponding to the periphery of the display region;
a first light emitting surface, an area of the first light emitting surface being greater than an area of the first light incident surface; and
a plurality of first light guiding channels independent from each other, each first light guiding channel extending from the first light incident surface to the first light emitting surface, and the first light guiding channels transmitting the image from the first light incident surface to the first light emitting surface and expanding the image such that the expanded image is displayed on the first light emitting surface;
wherein the display panel further comprises a first non-display region connecting the periphery of the display region, and the light emitting surface covers the periphery of the display region and the first non-display region in a top view of the display panel.

2. The display of claim 1, wherein the first image compensation apparatus comprises a plurality of first light guiding fibers each extending along a direction from the first light incident surface to the first light emitting surface, each first light guiding channel is defined by a corresponding first light guiding fiber of the plurality of first light guiding fibers, an area of the first light guiding fiber on the first light emitting surface is greater than an area of the first light guiding fiber on the first light incident surface, and a section area of the first light guiding fiber is maintained constant.

3. The display of claim 1, wherein each of the first light incident surface and the first light emitting surface is a planar surface, and the first light incident surface intersects with the first light emitting surface.

4. The display of claim 1, wherein the display panel further comprises a second image compensating apparatus extending an image of a corner of the display region to the region outside of the display region, the second image compensating apparatus comprising:
- a second light incident surface positioned adjacent and corresponding to the corner of the display region;
- a second light emitting surface, an area of the second light emitting surface being greater than an area of the second light incident surface; and
- a plurality of second light guiding channels independent from each other, each second light guiding channel extending from the second light incident surface to the second light emitting surface, and the second light guiding channels transmitting the image of the corner from the second light incident surface to the second light emitting surface and expanding the image of the corner such that the expanded image of the corner is displayed on the second light emitting surface.

5. The display of claim 4, wherein display panel further comprises a second non-display region located outside of the corner of the display region, and the second light emitting surface covers the corner of the display region and the second non-display region in a top view of the display panel.

6. The display of claim 5, wherein the second image compensation apparatus comprises a plurality of second light guiding fibers each extending along a direction from the second light incident surface to the second light emitting surface, each second light guiding channel is defined by a corresponding second light guiding fiber of the plurality of the second light guiding fibers, an area of the second light guiding fiber on the second light emitting surface is greater than an area of the second light guiding fiber on the second light incident surface, and a section area of the second light guiding fiber is increased along the direction from the second light incident surface to the second light emitting surface.

7. The display of claim 4, wherein the second light incident surface intersects with the second light emitting surface, the second light incident surface is a planar surface, and the second light emitting surface comprises two intersected planar surfaces.

8. A joint display, comprising:
- a first display panel comprising a first main display region, a first periphery display region, and a first non-display region, the first periphery display region being located between the first main display region and the first non-display region;
- a second display panel jointing the first non-display region; and
- a first image compensating apparatus comprising:
  - a first light incident surface positioned adjacent and corresponding to the first periphery display region;
  - a first light emitting surface covering the first periphery display region and the first non-display region in a top view of the display panel, an area of the first light emitting surface being greater than an area of the first light incident surface; and
  - a plurality of first light guiding channels independent from each other, each first light guiding channel extending from the first light incident surface to the first light emitting surface, and the first light guiding channels transmitting an image of the first periphery display region of the first display panel from the first light incident surface to the first light emitting surface and expanding the image such that the expanded image is displayed on the first light emitting surface.

9. The display of claim 8, wherein the second display panel comprises a second main display region, a second periphery display region, and a second non-display region, the second periphery display region being located between the second main display region and the second non-display region, the second non-display region jointing the first non-display region.

10. The display of claim 9, wherein the first light emitting surface covers the first periphery display region, the first non-display region, the second periphery display region, and the second non-display region in the top view of the display panel.

11. The display of claim 9, further comprising a second image compensating apparatus comprising:
- a second light incident surface positioned adjacent and corresponding to the second periphery display region;
- a second light emitting surface covering the second periphery display region and the second non-display region in the top view of the display panel, an area of the second light emitting surface greater than an area of the second light incident surface; and
- a plurality of second light guiding channels independent from each other, each second light guiding channel extending from the second light incident surface to the second light emitting surface, and the second light guiding channels transmitting an image of the second periphery display region from the second light incident surface to the second light emitting surface and expanding the image of the second periphery display region such that the expanded image of the second periphery display region is displayed on the second light emitting surface.

12. The display of claim 9, wherein the first image compensating apparatus and the second image compensating apparatus are fixed together.

* * * * *